March 5, 1935.  M. O. MAEDEL  1,992,957
AUTOMATIC GEAR SHIFT
Filed March 29, 1933  2 Sheets-Sheet 1
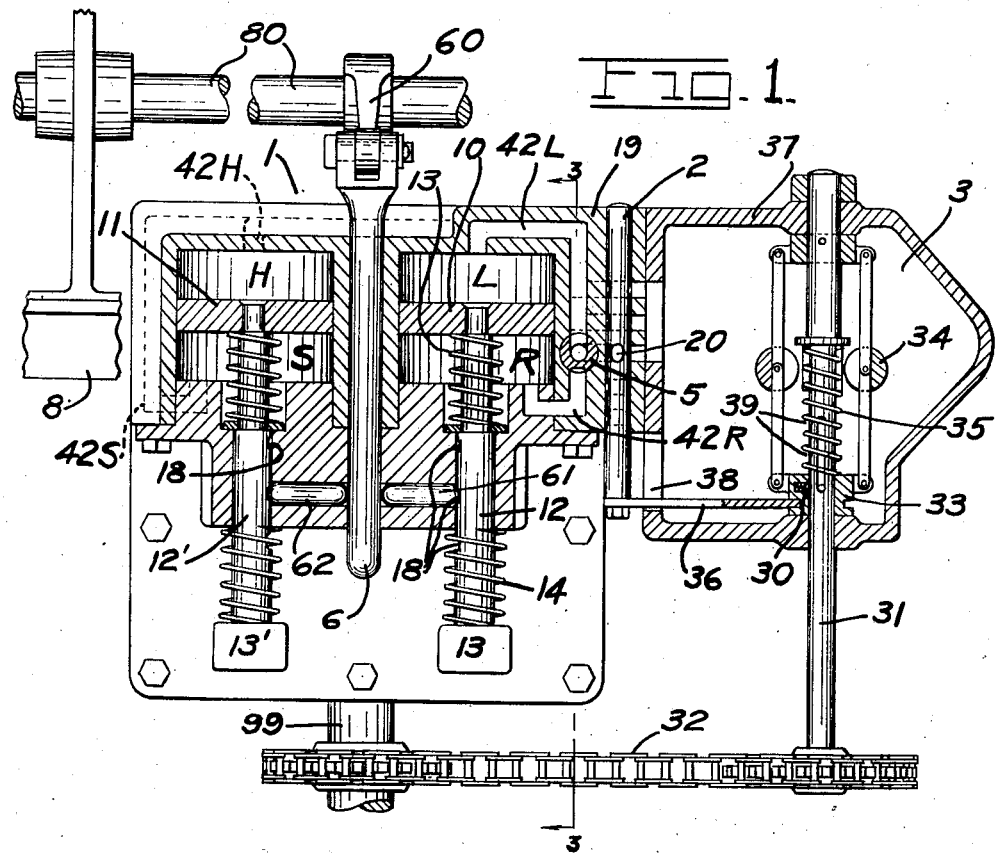
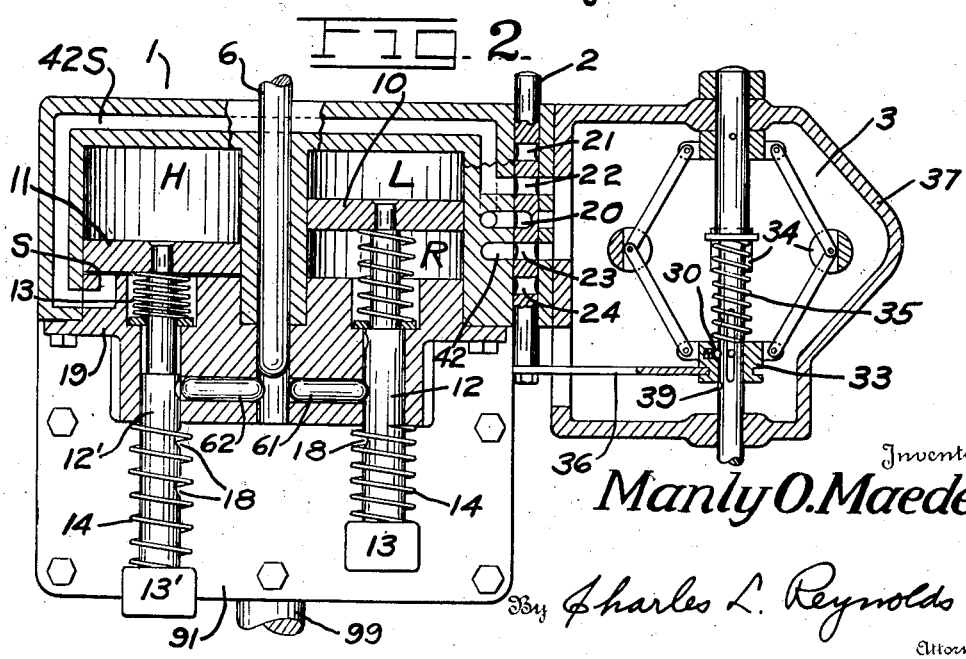
Inventor
Manly O. Maedel
By Charles L. Reynolds
Attorney

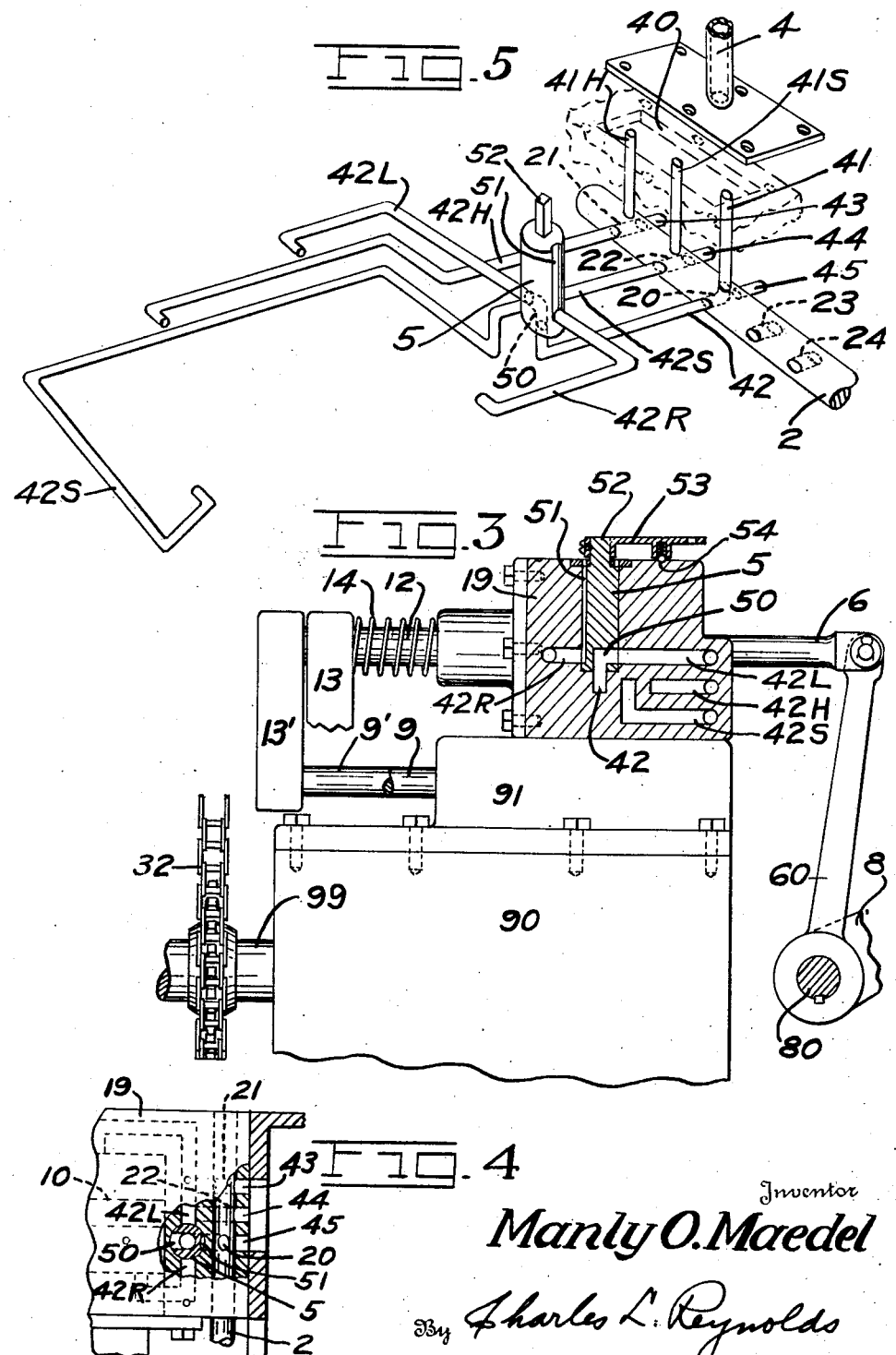

Patented Mar. 5, 1935

1,992,957

UNITED STATES PATENT OFFICE 1,992,957

AUTOMATIC GEAR SHIFT

Manly O. Maedel, Seattle, Wash.

Application March 29, 1933, Serial No. 663,...

6 Claims. (Cl. 74—336.5)

My invention relates generally to gear shifting mechanism, and is particularly designed for use with the gear shifting mechanism of an automobile.

It is an object of the present invention to devise means for shifting the gears of an automobile by power means, particularly such as may be operated by vacuum, and controlled by simple mechanical means responsive to vehicle speeds, whereby the exhaustion of a chamber, which is necessary to effect shifting, can be accomplished reliably, in advance of a manual or pedal operation, which last controls means that normally interdict the shifting operation, but which when moved, under the control of the driver or operator, permits immediate shifting of the gears under the influence of vacuum theretofore developed in the motor means.

It is a further object to devise such mechanism which will successively and automatically effect shifting first into low speed, and then successively into intermediate and high speeds, in accordance with the automobile's speed, and where the sole control necessary is that which controls the time of shifting, under the control of the driver.

It is a further object to provide such an automatic gear shift mechanism in which simple manual control means are provided for controlling alternatively the engagement of the forward and the reverse gears, particularly the low speed and the reverse gears.

A further object is to provide an automatic gear shift mechanism of the character generally indicated above, which shall be simple in construction, inexpensive to manufacture, and easily installed and connected, and one which will be reliable in operation.

It is also an object to devise such a gear shift mechanism which can be employed in connection with the ordinary foot-operated clutch, thereby to control the time of shifting, or which can be adapted to and employed in connection with an automatic clutch, wherein the disengagement of the clutch is under control of the operator indirectly through the medium of the accelerator pedal or like means, whereby the clutch may at times be automatically disengaged and reengaged.

With these and other objects in mind, as will appear as this description progresses, by invention comprises the novel parts, and the novel combination and arrangement thereof, as shown in the accompanying drawings, described in this specification, and as will be more particularly pointed out by the claims which terminate the same.

In the accompanying drawings I have shown my invention in a form which is at present preferred by me, it being understood that various changes in the form and arrangement of the parts may be made within the scope of the invention as hereinafter defined.

Figure 1 is a transverse sectional view through my device, showing parts in the neutral position.

Figure 2 is a view similar to Figure 1, showing parts in the position they would assume upon shifting into second or intermediate gear, and before reengagement of the clutch.

Figure 3 is a section on the line 3—3 of Figure 1, illustrating the device generally in side elevation.

Figure 4 is a detail section through the reverse valve, showing the same in neutral position.

Figure 5 is a diagrammatic showing of the suction conduits and the valves controlling the application of suction.

My invention is intended for use in connection with the ordinary transmission gearing of an automobile, and will be described in connection therewith, although it will be evident that it might be employed in other connections. Such a transmission is orginarily enclosed within a transmission casing 90, having a cover 91, from which project at the ends jack shafts 9 and 9'. These jack shafts shift axially as the gears are shifted. The jack shaft 9 controls shifting into low or first gear, on the one hand, or reverse, on the other hand. The jack shaft 9' controls shifting into second gear or into high gear. Projecting from the transmission casing 90 is a shaft 99 to which is connected the drive shaft of the automobile, and the rate of rotation of this shaft 99 is therefore a function of the speed of the vehicle.

To control application of power from the engine (not shown) to the transmission gears, a clutch is employed, and while such a clutch is not shown, the pedal 8 which controls this clutch is illustrated, this being supported upon a clutch shaft 80 suitably connected to engage and disengage the clutch upon depression of the pedal and oscillation of the shaft.

As a means for accomplishing shifting of the gears, or of the jack shafts 9 and 9', the movement of which controls shifting of the gears, I provide a motor means, generally indicated at 1, which in the present embodiment takes the form of pistons 10 and 11 received within cylinders formed in a casing 19, and normally being held in a position intermediate the ends of the cylinders, whereby to provide chambers L, R, S and H. It may be stated here that movement of the piston 10 into the chamber L accomplishes shifting into low gear, and movement of such piston into the chamber R accomplishes shifting into reverse gear. Similarly, movement of the piston 11 towards the chamber S accomplishes shifting into second gear, and movement of the same piston into the chamber H accomplishes shifting into high gear.

These pistons are carried upon rods 12 and 12', which are alike, and balanced springs 13 and 14 may be employed normally to maintain the pistons in the neutral position illustrated in Figure 1, each intermediate the ends of its respective cylinder. The piston rods extend exteriorly of the casing 19, and connect by arms 13 and 13' to the respective jack shafts 9 and 9' (see Figure 3). Thus movement of a piston 10 or 11 will effect corresponding movement of the jack shaft 9 or 9', respectively, by reason of the direct connection between the motor means and the gear shifting means.

Since it is preferable that the shifting be controlled automatically in accordance with the speed of the automobile, I provide speed responsive means, indicated generally at 3. These speed responsive means, since they must be simple and not subject to deterioration or malfunctioning due to wear or long usage, may conveniently take the form of a ball governor including a shaft 31 connected suitably, as by the sprocket chain 32, to the shaft 99, and thereby the speed of the shaft 31 is a function of the speed of the drive shaft, and therefore of the vehicle itself. The governor also comprises a collar 33, axially shiftable under the influence of the centrafugal force in the balls 34, and a return spring 35, tending to return parts to the starting position shown in Figure 1.

Controlling the operation of the motor means is a valve 2. Before describing the valve in detail it may be noted that it is mounted in the casing 19 in such manner as to be interposed on the one hand between a conduit 4 which is connected to a vacuum source (not shown), such as the intake manifold of the normal internal combustion engine employed in automobiles, and the several chambers L, S, H and R on the other hand. It will also be noted that the valve 2 is shiftable axially by means of an arm 36 secured to the valve and so connected to the shiftable collar 33 of the governor as to move the valve in accordance with movement of the governor. The position of the valve 2, therefore, is controlled in accordance with the speed of the vehicle.

The vacuum conduit 4, constituting the vacuum supply source, communicates with a chest in the casing 19, which is best shown in Figure 5 and indicated at 40. The conduits by which this vacuum is controlled and caused to communicate with some one of the several piston chambers can best be understood from a study of Figure 5, wherein the several conduits are shown as tubes, although normally they would be formed as cored passages in the casing 19.

Leading from the chest 4 are three conduits 41H, 41S and 41. These lead directly to the bore in which the valve 2 is slidable. Leading from this bore are corresponding conduits 42H, 42S and 42, and adapted for communication with the conduit 42, and corresponding in function to the conduits 42H and 42S, are conduits 42L and 42R. The conduit 42 leads to a manually operable reverse valve 5, which when turned in one position has a passage 50 affording communication between the conduit 42 and the conduit 42L, but which turned through 180° affords communication between the conduit 42 and the conduit 42R. The letter suffixes in connection with the numerals which designate these several conduits indicate the ultimate termination of the conduits in one of the four chambers H, S, L and R. The reverse valve 5 also has a vent 51 which when the passage 50 is in communication with the conduit 42L vents the conduit 42R, and which, of course, vents the conduit 42L when the passage 50 is in communication with the conduit 42R. Operation of the valve 5 may be suitably accomplished by providing it with a squared stem 52, whereon is secured an arm 53 suitably connected for operation by the driver, and having preferably means such as a ball catch device, indicated at 54, cooperating with suitably placed depressions in the casing 19, whereby the arm and valve may be positioned and held accurately in any one of three positions.

It has been described how the reverse valve 5 may be placed in position to communicate with the low gear conduit 42L or the reverse gear conduit 42R, and if it is placed in an intermediate position, as shown in Figure 4, communication cannot be had between the conduit 42 and either of the conduits 42L or 42R; consequently, with the automobile standing still, it is not possible to shift into low or into reverse gear, and because the automobile is standing still it cannot shift, as will be apparent hereafter, into second or high gear; therefore the car will stand still without the necessity of holding the clutch disengaged.

The valve 2 is provided with four through passages. These are designated, in order, 21, 22, 23 and 24. Between the through passages 22 and 23 there is a right angular passage 20. Opposite the conduits 42H, 42S and 42, previously referred to, are vent passages 43, 44 and 45, respectively, which communicate with the atmosphere, though as shown in Figures 1 and 2, they discharge into the governor casing 37 which has an aperture 38 in which the arm 36 works, this aperture 38 being freely open to the atmosphere.

With the valve 2 in the position shown in Figure 1, which corresponds to the position of Figure 5, the three conduits 41, 41S and 41H are in communication with a source of vacuum, namely, the chest 40 or the conduit 4. However, the conduits 41S and 41H are blanked off at the valve since the passages 21 and 22 are in communication with the respective vents 43 and 44, and are not in communication with the conduits 41H and 41S. The angular passage 20 of the valve, however, is in communication with the conduit 41, and also with the conduit 42.

Since the valve 5 is, in these figures, in position to afford communication between the common conduit 42 and the conduit 42L leading to the low gear chamber L, vacuum from the source is admitted through the several conduits and valves described into the chamber L, thereby applying a continuously acting force (the force of suction) within this chamber, urging the piston 10 to move into this chamber L from its neutral position. However, means are provided to prevent this movement immediately, and these means comprise, in effect, a means to lock the pistons in any given position until such time as the operator chooses, and preferably the locking means are connected to the clutch or the clutch operating means, so that actual movement of the motor means (the pistons) and the gear shifting means connected thereto into the previously evacuated chamber cannot be accomplished except during the time the clutch is disengaged, and upon reengagement of the clutch the parts are again locked in some one definite position, corresponding, for the position of the valves shown in Figures 1 and 5, to low gear position. The clutch can only be reengaged when the parts are in one definite position, corresponding to engagement in one gear position, as second gear, for example.

Such locking means may conveniently consist of a pin 6 slidable longitudinally in a bore of the casing 19, and connected to an arm 60 mounted upon or connected to the clutch shaft 80, so that upon disengagement of the clutch the pin 6 is withdrawn somewhat. When the clutch is engaged the pin 6 is disposed between two short bolts 61 and 62, the ends of which in turn are engaged within one of three notches 18 in the piston rods 12 and 12'. These notches are so positioned that with the bolt 62 engaged in the intermediate notch, the pistons are held in neutral position, and with the bolts engaged in the respective end notches, the pistons are held at one end or the other of the respective cylinders, and thus the shiftable means associated with the transmission gears, namely, the jack shafts 9 or 9', are held in one definite position. The pin 6 may have a rounded or wedge-like tip, the better to separate the bolts 61 and 62 after withdrawal and upon reengagement of the clutch.

It will be noted that the application of the vacuum force occurs automatically, and sufficiently in advance of the release of the locking means that the motor system is evacuated, hence moves immediately upon release of the locking means.

Now reverting to the valve 2 and its control of the movement, it will be seen from what has already been said that with the valve 2 in the starting position, the governor at rest, the vehicle stationary, and the engine running, the gears can be shifted by the vacuum means into low gear, or upon reversal of the position of the valve 5 into reverse gear, and upon reengagement of the clutch the vehicle will commence to move. At such time the chambers H and S are vented through the ports 21 and 22, and the chamber R or L, as the case may be, through the vent 51.

Assuming that the transmission is in low gear and the automobile is moving forward, as the shaft 99 revolves the governor commences to revolve, and the balls fly outward somewhat, in opposition to the spring 35. This causes axial movement of the shiftable collar 33 of the governor, and thereby effects axial movement of the valve 2 to an extent to place the angular passage 20 of the valve in communication with the conduits 41S and 42S. The through passage 22 now affords communication between the vent 43 and the conduit 42H, thus venting the high gear chamber H, while the through passage 23 affords communication between the passage 42 and the vent 45, thus venting the low gear chamber L. The reverse gear chamber R remains vented through the vent 51. Through the now shifted angular passage 20, vacuum is applied to the chamber S, and upon disengagement of the clutch and withdrawal of the pin 6, the shifting is immediately accomplished because the vacuum has already been applied to the chamber S, and the piston has been urged to move but has been held from movement by the locking bolt 62. Upon such movement, and upon reengagement of the clutch, the vehicle continues to move forward, and may gather speed, whereupon in similar manner the valve 2 is again shifted, venting the passages 42 and 42S, and bringing the angular passage 20 into communication with the conduits 41H and 42H, thus applying the vacuum force to urge movement of the piston 11 into the chamber H, and accomplishing such movement immediately upon disengagement of the clutch and withdrawal of the pin 6.

It will be evident that shifting in the opposite order can be accomplished in the same manner. That is to say, when going up hill, if the engine begins to labor and the vehicle loses speed, a shift can be made from high into second gear, or into low gear, by the same means.

Since it is desirable that the valve 2 be prevented from hunting or shifting with small variations in the automobile's speed, but that it shift definitely and immediately from one position to another, suitable snap-over means may be provided. These will hold the governor and the valve, the latter at least, in position corresponding to low gear, for example, until the speed of the automobile has definitely increased to an extent sufficient to make it desirable to shift to second gear. To this end I may provide such means as the spring ball catch 30 in the collar 33, engageable in turn in the three notches 39 in the shaft 31.

If the automobile is provided with an automatic clutch the same operation will apply except that the time of shifting is in this instance controlled by the disengagement and reengagement of the clutch by such automatic means as may be provided, and such automatic means are commonly under the control of the driver, as for instance, through a connection to the accelerator pedal, whereby upon release of the accelerator pedal the disengagement of the clutch is effected, and upon again depressing the accelerator pedal the clutch is reengaged. Therefore the control of the time of shifting is in effect indirectly under control of the operator, and the device may operate as well with such an automatic clutch as by pedal operation of the clutch directly under control of the driver. Where, in the claims, reference is made to movements of parts or control thereof by the driver, it is to be understood that this includes such indirectly controlled movements, as has just been explained.

What I claim as my invention is:

1. In combination with an automobile gear shifting mechanism including two members normally held in neutral position, and shiftable therefrom into positions wherein are engaged the reverse, low, second and high gears, two cylinders and a piston in each, dividing its cylinder into two chambers, and normally disposed in intermediate or neutral position therein, connecting means between each piston and one of said shiftable members, a control valve and seat therefor, three passages extending from the valve seat, one to the second-gear chamber, one to the high-gear chamber, and a third leading towards the low-reverse chambers, and branched, one branch extending to the reverse-gear chamber and the other branch to the low-gear chamber, a second valve controlling communication between the third passage and one or the other of said branches, and venting the other branch, and means movable automatically in accordance with the speed of the automobile to move said control valve to place a selected passage in communication with a vacuum source, and to vent the remaining passages.

2. The combination of claim 1, and means normally interdicting movement of the pistons, notwithstanding evacuation of a chamber, and operable under control of the driver to release a given piston for movement into the evacuated chamber.

3. In an automatic, vacuum-operated gear shifting mechanism including a clutch, two gear shifting members normally disposed in neutral position, and shiftable therefrom into operative positions, two cylinders, and a piston in each dividing its cylinder into two chambers, and normally disposed in intermediate or neutral position therein, evacuating means, means for establishing communicataion between said evacuating means and any selected cylinder chamber, to produce a vacuum therein and thereby to induce movement of a piston into such chamber, continuously-acting spring means to return the piston thus displaced to its intermediate position upon cessation of the vacuum in such chamber, and means to interdict movement of said pistons away from intermediate position under the influence of a vacuum produced in one of the cylinder chambers, or movement toward intermediate position under the influence of said continuously-acting spring means, said interdicting means being operable upon actuation of said clutch to permit movement of the pistons under such influences.

4. In a vacuum-operated gear shifting device, a cylinder, a piston therein dividing said cylinder into two chambers, and normally disposed in intermediate or neutral position therein, a control valve and seat therefor, evacuation means connected to said seat, a passage leading from said seat toward said cylinder and branched, one branch extending to each cylinder chamber, a second valve controlling communication between said passage and one or the other of said branches, and venting the other branch, whereby one chamber of the cylinder may be placed in communication with said evacuation means and the other with the atmosphere.

5. In an automatic, vacuum-operated gear shifting mechanism for an automotive vehicle, two members normally disposed in neutral position and shiftable therefrom into operative positions, wherein are engaged the reverse, low, second and high gears, two cylinders, and a piston in each dividing its cylinder into two chambers, such chambers corresponding respectively to engagement of the reverse, low, second and high gears, and said pistons being normally disposed in intermediate or neutral position in their respective cylinders, a valve seat having a plurality of ports, a passage extending from the several ports in said valve seat to each chamber, evacuating means in constant communication with said valve seat, a ball governor movable in accordance with the speed of the automobile, a selector valve in said valve seat connected to said governor to connect said evacuating means to the cylinder chamber corresponding to the vehicle's speed, thereby to produce a continuous vacuum in such chamber and induce movement of a piston thereinto, and spring means to return the piston thus displaced to the intermediate position upon later disconnection of the evacuating means from such chamber and cessation of the vacuum therein.

6. The combination of claim 5, and means to interdict movement of the pistons under the influence of the vacuum produced in the evacuated chamber or the spring means, said interdicting means being operable at will to release the pistons for movement under such influences.

MANLY O. MAEDEL.